UNITED STATES PATENT OFFICE.

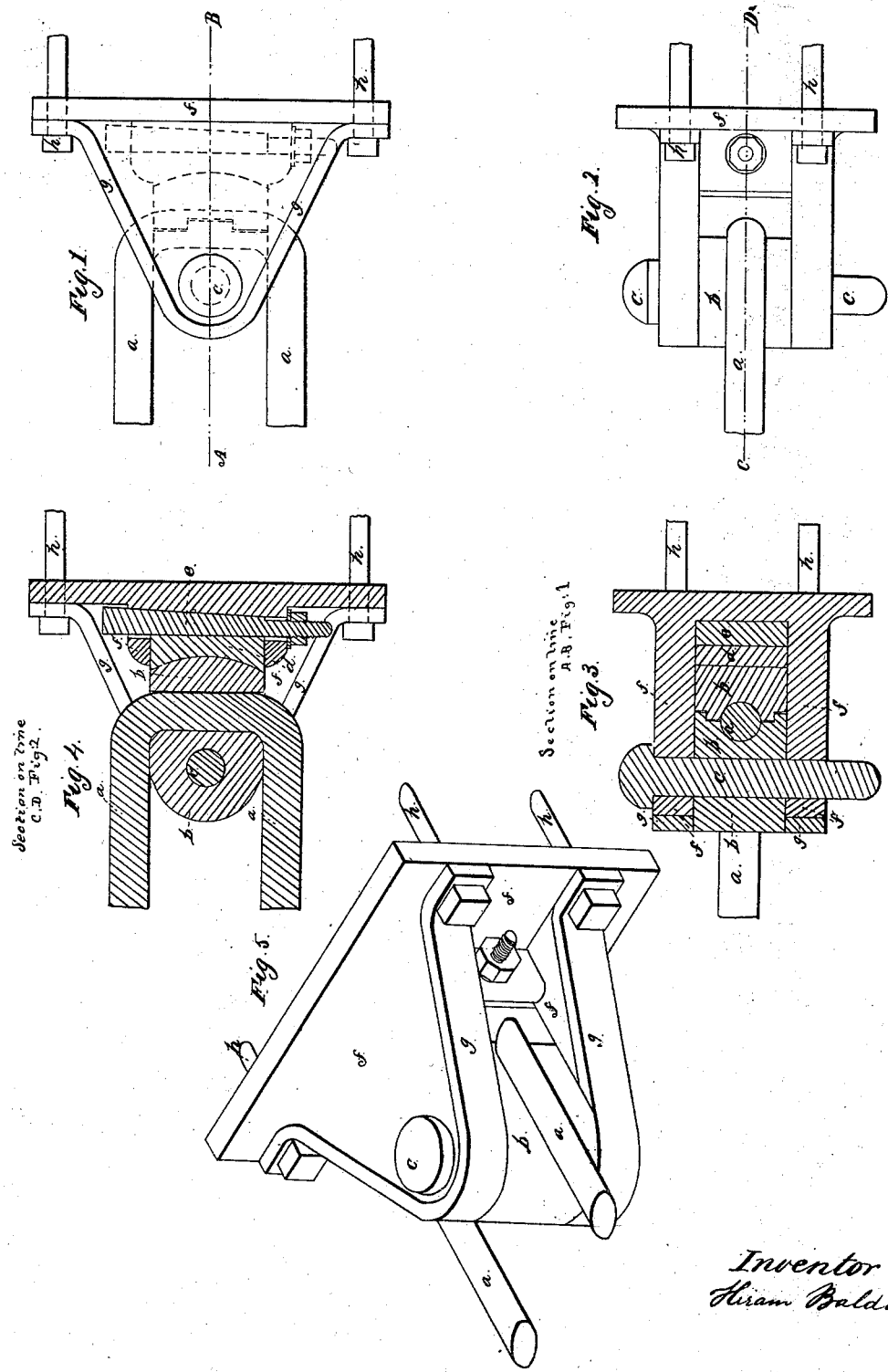

HIRAM BALDWIN, OF NASHVILLE, NEW HAMPSHIRE.

CAR-COUPLING.

Specification of Letters Patent No. 7,280, dated April 16, 1850.

*To all whom it may concern:*

Be it known that I, HIRAM BALDWIN, of Nashville, in the county of Hillsboro and State of New Hampshire, have invented a new and useful Improvement in Couplings for Connecting Locomotive-Engines and Tenders, of which the following is an exact description.

Figure 1, is a plan of the top of the coupling in its position when attached to the engine. Fig. 2 is a side elevation. Fig. 3 is a vertical section on the line A, B, Fig. 1. Fig. 4 is a horizontal section on the line C, D, Fig. 2. Fig. 5 is an isometrical elevation.

The part marked *a*, in all the figures, represents one half of a large link or draw iron, to connect the engine and tender. The other half is in every respect similar, and in the same manner connected at the other extremity with parts similar to those shown upon the drawings and described below.

The part marked *b*, in Figs. 2, 3, 4 and 5, represents a box or bearing made in two pieces as represented in Fig. 2, and through which the draw-iron passes. The back or extremity outside of the draw iron is made a part of a circle, the center of which is the center of the bolt *c*, Fig. 4.

*c*, represents a bolt, passing through the bearing *b*, and which sustains the strain communicated by the draw bolt.

*d*, Figs. 3 and 4, is a bed piece, lying behind the bearing *d*, and made circular upon its front side to fit the back of the bearing.

*e*, is a wedge or key, passing between the bed piece *d*, and the frame of the coupling, and so secured by a screw and nut that it can be tightened or loosened at pleasure. The frame is slightly beveled to fit this key, and by tightening or loosening the part *e*, as above described, any desirable degree of closeness may be maintained between the parts *a* and *b*, *b* and *c*, or *b* and *d*.

*f*, represents the frame of the coupling.

*g*, represents the straps or straining pieces, of some strong material, to enable the whole to bear a great strain.

*h*, represents bolts for attaching the coupling to the engine or tender.

The other half of the coupling not represented in the drawings, is in every respect similar to the one above described, and the design is, for one to be attached to the engine and the other, to the tender, and connected by a whole link or draw iron, one half of which is represented as above described by the letter *a*.

What I claim as my invention and desire to secure by Letters Patent, is—

1. The combination of the draw iron *a*, with the bearing *b*, the bolt *c*, the bed piece *d*, and the wedge or key *e*, in such manner that the draw iron *a*, makes a vertical joint with the bearing *b*, and through the bearing *b*, makes a horizontal joint with the bolt *c*, and the bed piece *d*; and through the wedge or key *e* all these joints are brought to any desirable rigidity of bearing.

2. I claim this particular combination of the parts described, whereby a free, but close horizontal and vertical joint is at all times maintained between the bodies to which it is attached, and epecially the applications of couplings upon this construction, to the connection of locomotive engines and tenders.

Nashville, February 5" 1850.

HIRAM BALDWIN.

Signed in presence of—
GEO. STARK,
L. H. CLEMENTS.